No. 839,968. PATENTED JAN. 1, 1907.
H. B. SPERRY.
FRAME CONSTRUCTION FOR SIDE DELIVERY RAKES.
APPLICATION FILED OCT. 10, 1906.
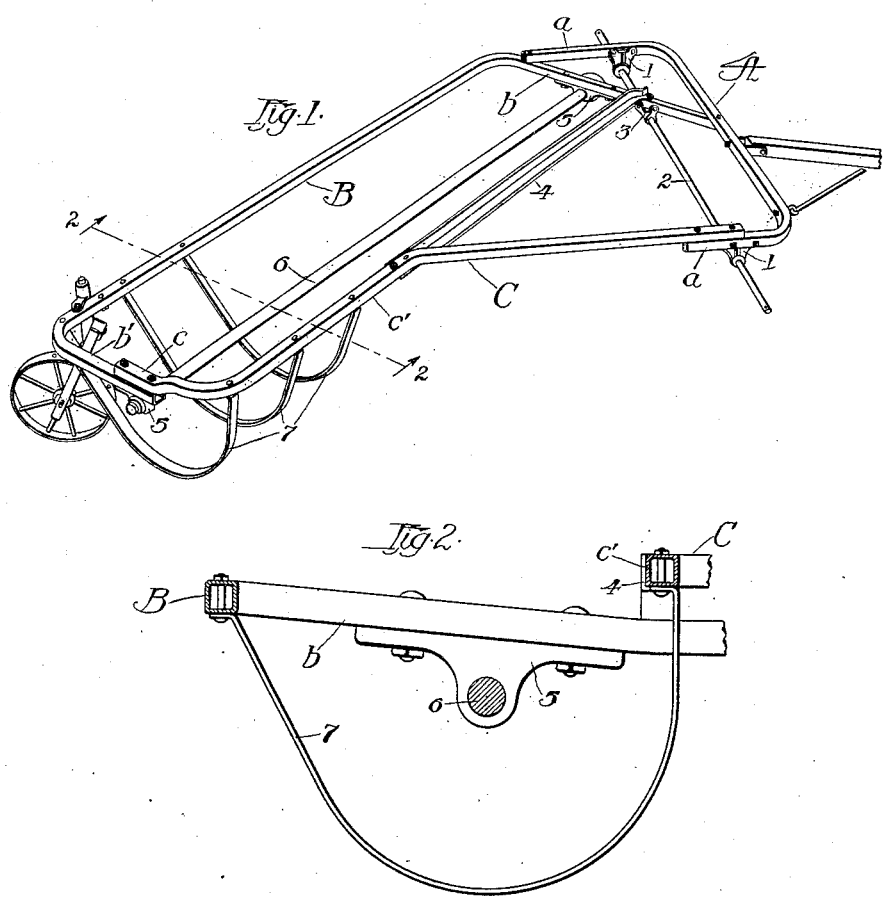
Witnesses:
F.W. Hoffmeister.
F.N. Daggett.
Inventor
Herbert B. Sperry
By J.C. Warnes
Attorney

UNITED STATES PATENT OFFICE.

HERBERT B. SPERRY, OF SPRINGFIELD, OHIO, ASSIGNOR TO INTERNATIONAL HARVESTER COMPANY, A CORPORATION OF NEW JERSEY.

FRAME CONSTRUCTION FOR SIDE-DELIVERY RAKES.

No. 839,968.      Specification of Letters Patent.      Patented Jan. 1, 1907.

Application filed October 10, 1906. Serial No. 338,237.

*To all whom it may concern:*

Be it known that I, HERBERT B. SPERRY, a citizen of the United States, residing at Springfield, in the county of Clark and State of Ohio, have invented a new and useful Improvement in Frame Construction for Side-Delivery Rakes, of which the following is a complete specification.

This invention relates to frames for side-delivery rakes, and has for its object the production of a frame rigid in construction, simple in design, and economically built.

Figure 1 represents a perspective view of the complete frame, and Fig. 2 is a transverse section taken on the line 2 2 of Fig. 1.

The frame consists of the front transversely-disposed extended U-shaped bar A, formed of rectangular tubular steel, and in suitable castings 1, which are secured to the rearwardly-bent ends *a* of the bar A, is mounted the main supporting-wheel axle 2. The diagonally-disposed portion of the frame is formed of the tubular extended U-shaped steel bar B and the tubular bent bar C. The forward end *b* of the bar B is secured to the rearwardly-deflected end *a* of the bar A. Thence it extends obliquely forwardly and inwardly above the axle 2 to a point near the center of the bar A, to which it is rigidly secured. A hanger 3 forms a support for the axle 2 upon the arm *b*. The deflected end *c* of the bar C is fixed at its rear end to the rear transversely-deflected arm *b'* of the bar B, which has a portion *c'* of its length arranged parallel with the main portion of the bar B, its forward end being secured to the rearwardly-bent arm *a* of the front U-shaped bar A. An angle-bar 4 is fixed to the bar C at its forward point of deflection, extends parallel with the bar B, and is fixed rigidly to the forward end of said bar B. This angle-bar, while not essential to the frame construction, is preferably introduced as shown and acts not only as a brace to the frame, but also serves as a support to which are secured the forward ends of some of the stripper-bars.

In hangers 5, secured to the ends *b* and *b'* of the bar B, is journaled the rake-head shaft 6. The usual strippers 7, consisting of flat bars, are secured to the frame and arranged at right angles to the rake-head shaft 6.

What I claim as my invention, and desire to secure by Letters Patent, is—

1. A frame for side-delivery rakes, comprising a forward-extended U-shaped bar, a rearwardly and diagonally disposed extended U-shaped bar attached at two points to said forward bar, and a bent bar connecting the ends of the forward bar and the diagonally-disposed bar.

2. A frame for side-delivery rakes, comprising a forward-extended U-shaped bar, a rearwardly and diagonally disposed extended U-shaped bar attached at two points to said forward bar, a bent bar connecting the ends of the forward bar and the diagonally-disposed bar, and a brace connecting the bent bar at a point intermediate of its length with the forward part of the frame.

3. A frame for side-delivery rakes, comprising a forward-extended U-shaped bar, a rearwardly and diagonally disposed extended U-shaped bar attached at two points to said forward bar, a bent bar connecting the ends of the forward bar and the diagonally-disposed bar, the said bent bar having a portion of its length arranged parallel with the main portion of the said diagonally-disposed bar, and a brace connecting the bent bar at a point intermediate of its length with the forward part of the frame.

4. A frame for side-delivery rakes, comprising a forward-extended U-shaped bar, a main wheel-axle supported thereby, a rearwardly and diagonally disposed extended U-shaped bar attached at two points to said forward bar, a rake-head shaft mounted thereon, a bent bar connecting the ends of the forward bar and the diagonally-disposed bar, the said bent bar having a portion of its length arranged parallel with the main portion of the said diagonally-disposed bar, all of said bars being constructed of square tubular steel, and a brace connecting the bent bar at a point intermediate of its length with the forward limb of the diagonally-disposed bar.

HERBERT B. SPERRY.

Witnesses:
    MILLIE WEY,
    C. B. CULP.